July 2, 1940.   R. MUEHLHOFER   2,206,421
FERMENTATION VAT AND LINING THEREFOR
Filed March 16, 1938   2 Sheets-Sheet 1

RICHARD MUEHLHOFER
INVENTOR

BY Chester Mueller
ATTORNEY

July 2, 1940.                R. MUEHLHOFER                2,206,421
                    FERMENTATION VAT AND LINING THEREFOR
                Filed March 16, 1938          2 Sheets-Sheet 2

RICHARD MUEHLHOFER
INVENTOR

BY Chester Mueller
ATTORNEY

Patented July 2, 1940

2,206,421

UNITED STATES PATENT OFFICE 2,206,421

FERMENTATION VAT AND LINING THEREFOR

Richard Muehlhofer, Mountainside, N. J.

Application March 16, 1938, Serial No. 196,091

4 Claims. (Cl. 126—371)

This invention relates to fermentation vats and linings therefor and has for one object the protection of the interior surfaces of such vats. Another object is to provide a removable liner for fermentation vats or the like, and means for supporting and retaining such a liner in position.

Still another object is to furnish means for collecting and removing the froth and scum, usually deposited on the interior walls of a vat containing a fermenting liquid, at or near the surface level of the liquid.

Other objects will appear in the description which follows:

At the present time liquids such as beer, ale and the like are fermented in large vats or tanks that generally have a specially prepared or treated interior surface with which the liquid comes into contact. During the fermentation period the surface of the liquid is covered with a froth. Upon removing the liquid from the vat in which it has been fermenting this froth will be found to have left a deposit of scum around the interior of the vat where it has come in contact with it.

Heretofore this scum ring has been removed from the interior of the empty vat by laborious hand work preparatory to using the vat for the next batch or lot of liquid. Not only is this an expensive and time consuming operation but a treated interior vat surface is subject to injury by frequent cleanings. My invention permits the installation of a removable flexible liner as a protective cover for the interior surface of a vat or tank where the froth or foam from the fermenting liquid is likely to contact it.

My invention is illustrated in the accompanying drawings in which.

Referring to the drawings in which similar numbers identify the same or similar parts thruout the several views, the construction and use is as follows.

The vats or tanks used for fermenting liquids may be circular or rectangular in shape altho in the figures, vat 1 is shown as rectangular. Such vats vary in size and generally are capable of holding a considerable quantity of liquid, the surface level of which in the illustrations is indicated only by lines 2—2.

Figure 1:
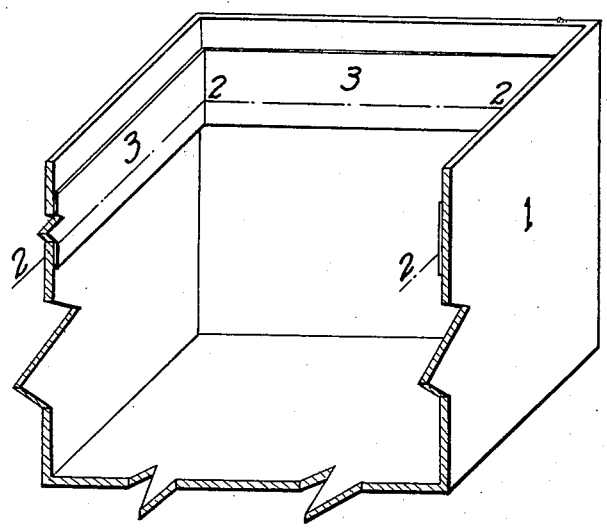
Figure 1 is an isometric view of a rectangular vat broken away to show a liner in place.

In Figure 1 I show the simplest application of my invention which consists in lining the interior of vat 1 with a flexible liner 3, completely around the tank and extending from below the surface level of the liquid to above the anticipated surface level of the froth.

Lining or covering 3 consists of a vegetable parchment paper or like material that is resistant to penetration of moisture and is neither harmful to the liquid contained in the vat nor has any adverse effect on its taste or color. Many disposable or washable materials are satisfactory and fill the necessary requirements. Vegetable parchment paper I find not only possesses the desired qualities but is economical to use. It may be washed after using and used again and again without being destroyed.

As shown in Figure 1, the lining 3 is applied as an adherent covering to the interior walls of vat 1 before any liquid is introduced into the vat. When fermentation has ceased and the liquid is withdrawn, which may be after a lapse of a number of days, the liner 3 is peeled from the interior surfaces of the vat, carrying away with it the scum ring deposited thereon. Any harmless adhesive material may be used to hold the liner 3 to the vat walls, provided it permits the ready removal of the liner and does not of itself become objectionable when a new liner is to be applied.

Figure 2:
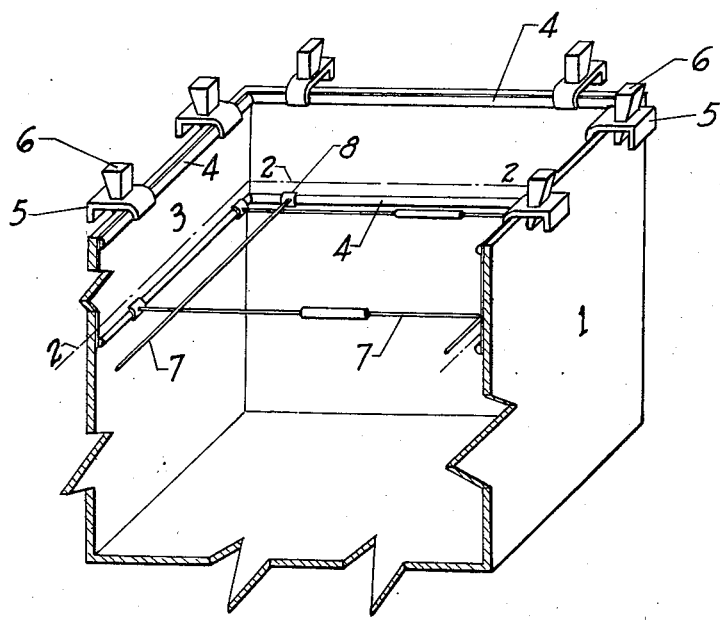
Figure 2 is a view similar to Figure 1 showing another means of attaching my lining.
Figure 3:
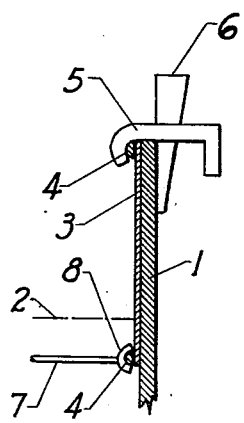
Figure 3 is a part sectional view in elevation of a side wall of the vat of Figure 2.

In Figure 2 I illustrate another method of attaching a lining in a vat. In this case liner 3 extends from just below the surface level of the liquid to the top of the tank. No adhesives are used but the liner 3 is gripped at its bottom and top edges by adjoining clamping bars or bearing strips 4. Clamping bars or bearing strips 4 consist of a bar body faced with rubber so that the rubber surface bears on liner 3.

Clamping bars or bearing strips 4 are held against liner 3 by clamps 5, which may be separate units or integral with the bars. The clamping action of the clamps at the top may be derived from wedge 6 driven between the edge of the vat 1 and the tail of the clamp 5 or by any other suitable means, such as a clamping screw, an eccentric or other device. The clamping bars or bearing strips 4 along the bottom edge may be firmly held against liner 3 by adjustable length transverse members 7 whose concave shaped ends 8 bear on the clamping bars or bearing strips if not made integral with them. Various other means for holding the bottom edge of liner 3 against the vat's interior surface may of course be used.

Figure 4:
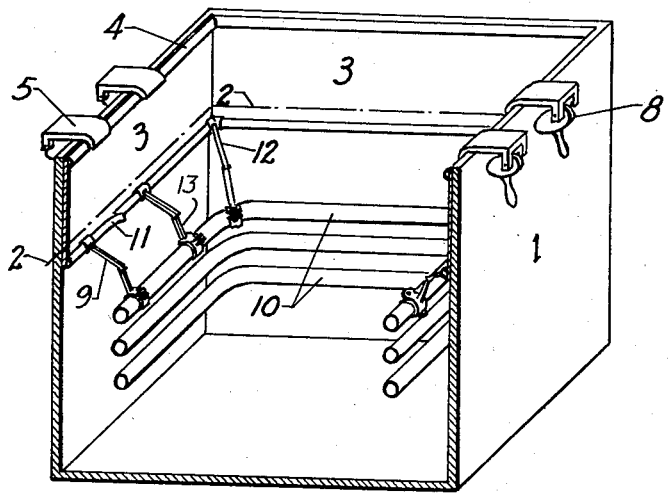
Figure 4 is a view similar to Figure 1 showing still another means of securing a liner in place inside a vat.
Figure 5:
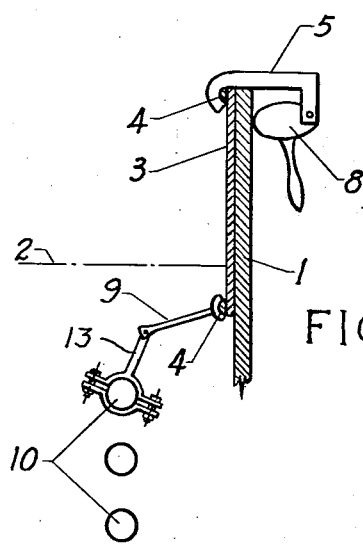
Figure 5 is a part sectional view in elevation of the vat of Figure 4 at one of the side walls.

In Figures 4 and 5 I show another method of holding liner 3 in place, adapted to vats or tanks containing pipe coils, such as beer or ale tanks. As in the case of the vat of Figure 2, liner 3 extends from below the surface level of the liquid to the top edge of the vat. The top edge is held by clamping bars or bearing strips 4 which in turn are gripped by clamps 5 which may be separate units or integral with the bars. Figures 4 and 5 show clamps 5 endowed with a clamping action by eccentric 8 that pivots in the tail of the clamp and bears on the edge of the vat.

The clamping bars or bearing strips 4 at the bottom are carried on arms 9 which are pivoted to brackets 13 fastened to heat exchanger coils 10. The weight of arms 9 and the angle at which they are disposed to the side wall of vat 1 will be sufficient to hold liner 3 firmly in place along its bottom edge.

The clamping bars or bearing strips 4 may be made of any convenient length, separate from or integral with two or more arms 9 per bar. For rectangular vats an adjustable length arm 12 as a separate unit may be arranged at the corners, as shown, to add stability at these locations. The clamping bars or bearing strips 4 may be shaped at one end as shown at 11 to permit overlapping where they adjoin.

The clamps and bars require only the evident modifications to be adapted for circular vats to permit the rapid removal and renewal of liners as I have described.

It is apparent that many other modifications of my invention may be made. The foregoing description is intended to be illustrative only and in no way limiting upon the scope of my invention.

What I claim is:

1. In a fermentation vat means for removably securing a flexible lining at and above the liquid surface level, comprising heat exchanger coils bearing strips and clamps adapted to the top edge of the vat and members adapted to bear against the interior walls of the vat supported by said vat heat exchanger coils.

2. In a fermentation vat, heat exchanger coils and a flexible non-permeable lining supported from the top edge and extending below the liquid surface level, and brought into flat contact with the interior walls of the vat by rubber faced rigid strips bearing upon the lower portion of the lining, pivotably supported on said vat heat exchanger coils.

3. In a fermentation vat, heat exchanger coils and a flexible non-permeable lining extending from the top of the vat to below the liquid surface level retained in flat contact with the interior walls of the vat by holding means comprising bearing strips and clamps at the rim of the vat and bearing strips within the body of the vat supported pivotably on said vat heat exchanger coils.

4. In a fermentation vat heat exchanger coils and means for holding the bottom edge of a flexible lining extending from the top of the vat partially to the bottom thereof, in flat contact with the interior walls of the vat, comprising a plurality of arms pivotable in vertical planes, supported on said vat heat exchanger coils and bearing at their free ends with bearing surfaces upon the interior walls of the vat.

RICHARD MUEHLHOFER.